US009081785B2

(12) United States Patent
Mandelstein et al.

(10) Patent No.: US 9,081,785 B2
(45) Date of Patent: Jul. 14, 2015

(54) INFERRING VALID VALUES FOR OBJECTS IN A GLOSSARY USING REFERENCE DATA

(71) Applicant: International Business Machines Corporation, Armonk, NY (US)

(72) Inventors: Dan J. Mandelstein, Austin, TX (US); Ivan M. Milman, Austin, TX (US); Sushain Pandit, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 112 days.

(21) Appl. No.: 13/708,351

(22) Filed: Dec. 7, 2012

(65) Prior Publication Data

US 2014/0164399 A1    Jun. 12, 2014

(51) Int. Cl.
G06F 17/30    (2006.01)

(52) U.S. Cl.
CPC ................. G06F 17/30115 (2013.01)

(58) Field of Classification Search
CPC ................................................ G06N 5/022
USPC .......................................... 707/603; 706/45
See application file for complete search history.

(56) References Cited

U.S. PATENT DOCUMENTS

| 7,333,997 | B2 * | 2/2008 | Maren et al. ........................... 1/1 |
| 7,912,823 | B2 * | 3/2011 | Ferrari et al. ................. 707/705 |
| 7,945,438 | B2 | 5/2011 | Balmelli et al. |
| 8,055,664 | B2 | 11/2011 | Baluja et al. |
| 8,229,878 | B2 | 7/2012 | Michelin |
| 8,250,101 | B2 | 8/2012 | Fot et al. |
| 2008/0021909 | A1 | 1/2008 | Black et al. |
| 2008/0024348 | A1 | 1/2008 | Liu |
| 2008/0091690 | A1 | 4/2008 | Ellersick et al. |
| 2008/0109450 | A1 | 5/2008 | Clark et al. |
| 2008/0177725 | A1 | 7/2008 | Bravery et al. |
| 2008/0243488 | A1 | 10/2008 | Balmelli et al. |
| 2010/0169758 | A1 | 7/2010 | Thomsen |
| 2011/0145005 | A1 | 6/2011 | Cao et al. |
| 2011/0178794 | A1 | 7/2011 | Michelin |

(Continued)

FOREIGN PATENT DOCUMENTS

WO    2004109546 A1    12/2004
WO    2008028649 A2    3/2008

OTHER PUBLICATIONS

Sarraipa, Joao et al., Mentor—A Methodology for Enterprise Reference Ontology Development, Sep. 2008, p. 6-32-6-40, vol. 1, International IEEE Conference, Piscataway, United States.

(Continued)

*Primary Examiner* — Baoquoc N To
(74) *Attorney, Agent, or Firm* — Patterson & Sheridan, LLP

(57) ABSTRACT

Method, system, and computer program product to improve a coverage of a plurality of classifications between a plurality of terms in a glossary and a set of values in a reference data management system, by identifying a first classification, of the plurality of classifications in the glossary, between a first term in the glossary and a first set of values in the reference data management system, detecting a relationship between the first set of values and a second set of values in the reference data management system, and upon determining that a relevance score for a relevant value from the second set of values exceeds a predefined threshold, identifying the relevant value to be classified with the term in the glossary, wherein the glossary is configured to create a second classification between the first term and the relevant value.

21 Claims, 4 Drawing Sheets

(56) References Cited

U.S. PATENT DOCUMENTS

2012/0101975 A1    4/2012  Khosravy
2012/0221301 A1*   8/2012  Umeda et al. .................... 703/2
2012/0330869 A1*  12/2012  Durham ......................... 706/16

OTHER PUBLICATIONS

Anonymous, User Profile Driven Discovery and Maintenance of relationship between Documents and Hierarchical Business Glossary, IP.com, Prior Art Database, Feb. 3, 2012, Fairport, United States.

* cited by examiner

INFERRING VALID VALUES FOR OBJECTS IN A GLOSSARY USING REFERENCE DATA

BACKGROUND

The present invention relates to computer software, and more specifically, computer software that infer valid values for objects in a business glossary by using reference data from a reference data management system.

A business glossary is often used to manage a controlled vocabulary of terms utilized across an enterprise. A business glossary may provide a way to assign (or classify) assets (objects) to a taxonomy of terms and categories. These assignments have been a manual, user-driven process, which may produce errors, and may not result in exhaustive assignments.

Reference data is a special class of metadata/master data, which may be referenced across multiple systems. Reference data management (RDM) systems have emerged to ensure consistency of reference data across applications and between enterprises.

SUMMARY

Embodiments disclosed herein provide a system, method, and computer program product to improve a coverage of a plurality of classifications between a plurality of terms in a business glossary and a set of values in a reference data management system, by identifying a first classification, of the plurality of classifications in the business glossary, between a first term in the business glossary and a first set of values in the reference data management system, detecting a relationship between the first set of values and a second set of values in the reference data management system, and upon determining that a relevance score for a relevant value from the second set of values exceeds a predefined threshold, identifying the relevant value to be classified with the term in the business glossary, wherein the business glossary is configured to create a second classification between the first term and the relevant value.

DETAILED DESCRIPTION

Figure 1:
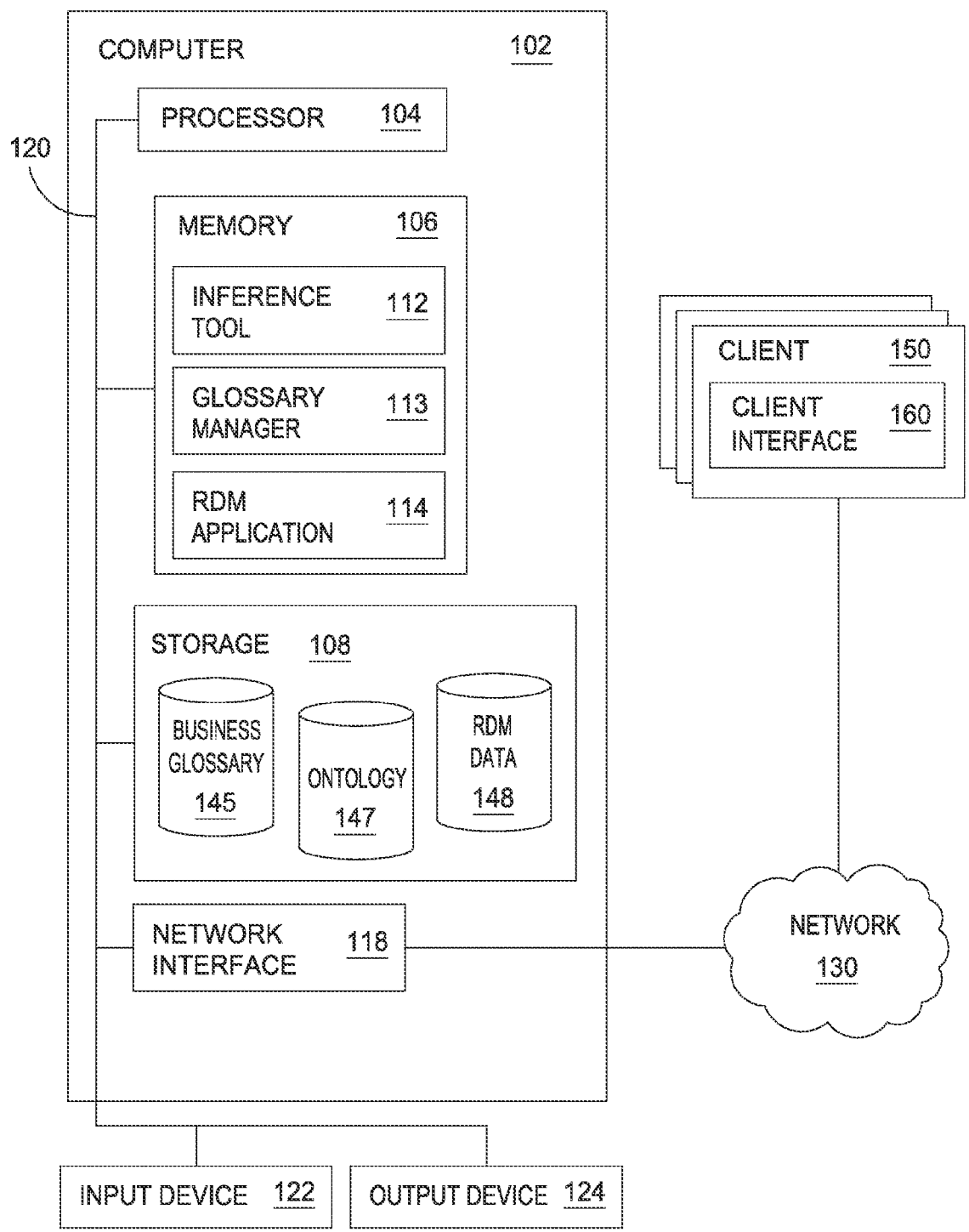
FIG. 1 is a block diagram illustrating a system to infer valid values for objects in a business glossary by using reference data, according to one embodiment disclosed herein.

Embodiments disclosed herein improve the accuracy and scope of coverage of term-to-asset assignments (also referred to herein as "classifications") between terms in a business glossary and reference data values in an RDM system, resulting in improved precision and recall while searching for a linked asset or a term. The semi-automatic approach disclosed herein identifies candidate assignments which may then be presented to a data steward for approval. By using the semi-automatic approach and learning from existing knowledge (in the form of relationships, semantics, mappings, hierarchies, and the like) in the RDM system, there may be a higher probability of producing a complete set of assignments for a term in the business glossary.

To infer reference data values, embodiments disclosed herein may detect the presence of the same or similar properties being mapped to data values of two different sets, which may imply that there is a relationship between the first set, which has been associated with a term in the business glossary, and the second set, which has not been associated. In such a case, values from the second set may be identified as possible valid values to associate with the term in the business glossary. In addition, embodiments disclosed herein may infer reference data values by detecting that hierarchical values from two different reference data sets are mapped to each other, and that the mapped values are at the same level in their respective hierarchies, implying a tighter coupling between the two reference data sets. Additionally, embodiments disclosed herein may allow for the validation of existing assignments by identifying contradictions which may then be presented to the data steward for verification and possible removal.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications to infer valid values for objects in a business glossary, or related data available in the cloud. For example, the application could execute on a computing system in the cloud and update classifications for terms in the business glossary. In such a case, the application could infer values and store the resulting classifications at a storage location in the cloud. Doing so allows a user to access this information from any computing system attached to a network connected to the cloud (e.g., the Internet).

FIG. 1 is a block diagram illustrating a system 100 to infer valid values for objects in a business glossary by using reference data, according to one embodiment disclosed herein. The networked system 100 includes a computer 102. The computer 102 may also be connected to other computers via a network 130. In general, the network 130 may be a telecommunications network and/or a wide area network (WAN). In a particular embodiment, the network 130 is the Internet.

The computer 102 generally includes a processor 104 connected via a bus 120 to a memory 106, a network interface device 118, a storage 108, an input device 122, and an output device 124. The computer 102 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 104 is included to be representative of a single CPU, multiple CPUs, a single CPU having multiple processing cores, and the like. Similarly, the memory 106 may be a random access memory. While the memory 106 is shown as a single identity, it should be understood that the memory 106 may comprise a plurality of modules, and that the memory 106 may exist at multiple levels, from high speed registers and caches to lower speed but larger DRAM chips. The network interface device 118 may be any type of network communications device allowing the computer 102 to communicate with other computers via the network 130. In some embodiments, a plurality of clients computers 150 may connect to the network 130, where data stewards may approve the addition of associations between terms in a business glossary and reference data values through the client interface 160.

The storage 108 may be a persistent storage device. Although the storage 108 is shown as a single unit, the storage 108 may be a combination of fixed and/or removable storage devices, such as fixed disc drives, solid state drives, floppy disc drives, tape drives, removable memory cards or optical storage. The memory 106 and the storage 108 may be part of one virtual address space spanning multiple primary and secondary storage devices.

As shown, the memory 106 contains the inference tool 112, which is an application generally configured to infer valid values for objects in a business glossary by utilizing knowledge from an RDM system. Generally, the inference tool 112 analyzes existing knowledge in the RDM data 148, which may include user-defined associations, to identify additional values that may be associated with objects in the business glossary 145. The memory 106 also contains the glossary manager 113, which is an application generally configured to allow users to create and manage an enterprise vocabulary and classification system using a domain-specific collection of industry standard terms and definitions. The glossary manager 113 may store the enterprise vocabulary and classification system as the business glossary 145. An example of a business glossary is IBM's InfoSphere Business Glossary. The memory 106 also contains the RDM application 116, which is an application generally configured to manage reference data stored in the RDM data 148. For example, the RDM application 116 may be configured to ensure consistency of reference data in the RDM data 148 across applications and between enterprises. The RDM application 116 may generally provides enterprises a single place to create, update, review, and distribute reference data across an enterprise. An example of an RDM application is IBM InfoSphere Master Data Management Reference Data Management Hub. In one embodiment, the inference tool 112 may be a component of the glossary manager 113.

As shown, the storage 108 contains the business glossary 145, which contains a controlled vocabulary and defined classifications between business assets and a taxonomy of terms and categories. The ontology 147 is a general purpose ontology, which provides the structural framework for organizing information. An ontology formally represents knowledge as a set of concepts within a domain, and the relationships between those concepts. The ontology 147 may therefore be used in conjunction with the business glossary 145 to provide a more robust business glossary for the enterprise. The RDM data 148 includes reference data values, relationships between sets, semantics, many-to-many mappings, properties of reference data values, and hierarchies which may be induced on the reference data values. Generally, reference data defines a set of values that describes other values, for example terms in the business glossary 145. Although depicted as a database, the business glossary 145, ontology 147, and RDM data 148 may take any form sufficient to store data, including text files, xml data files, and the like.

The input device 122 may be any device for providing input to the computer 102. For example, a keyboard and/or a mouse may be used. The output device 124 may be any device for providing output to a user of the computer 102. For example, the output device 124 may be any conventional display screen or set of speakers. Although shown separately from the input device 122, the output device 124 and input device 122 may be combined. For example, a display screen with an integrated touch-screen may be used.

In another embodiment, the system of a common data integration platform such as an IBM® InfoSphere® Information Server can be installed also across multiple servers representing a single processing system exploiting the hardware resources of several servers. In such an environment, an application might use resources on one or several servers. For example, one server may execute IBM InfoSphere Business Glossary, and another may execute IBM InfoSphere Reference Data Management (RDM) Server. (IBM and InfoSphere are trademarks of International Business Machines Corporation, registered in many jurisdictions worldwide.)

Figure 2:
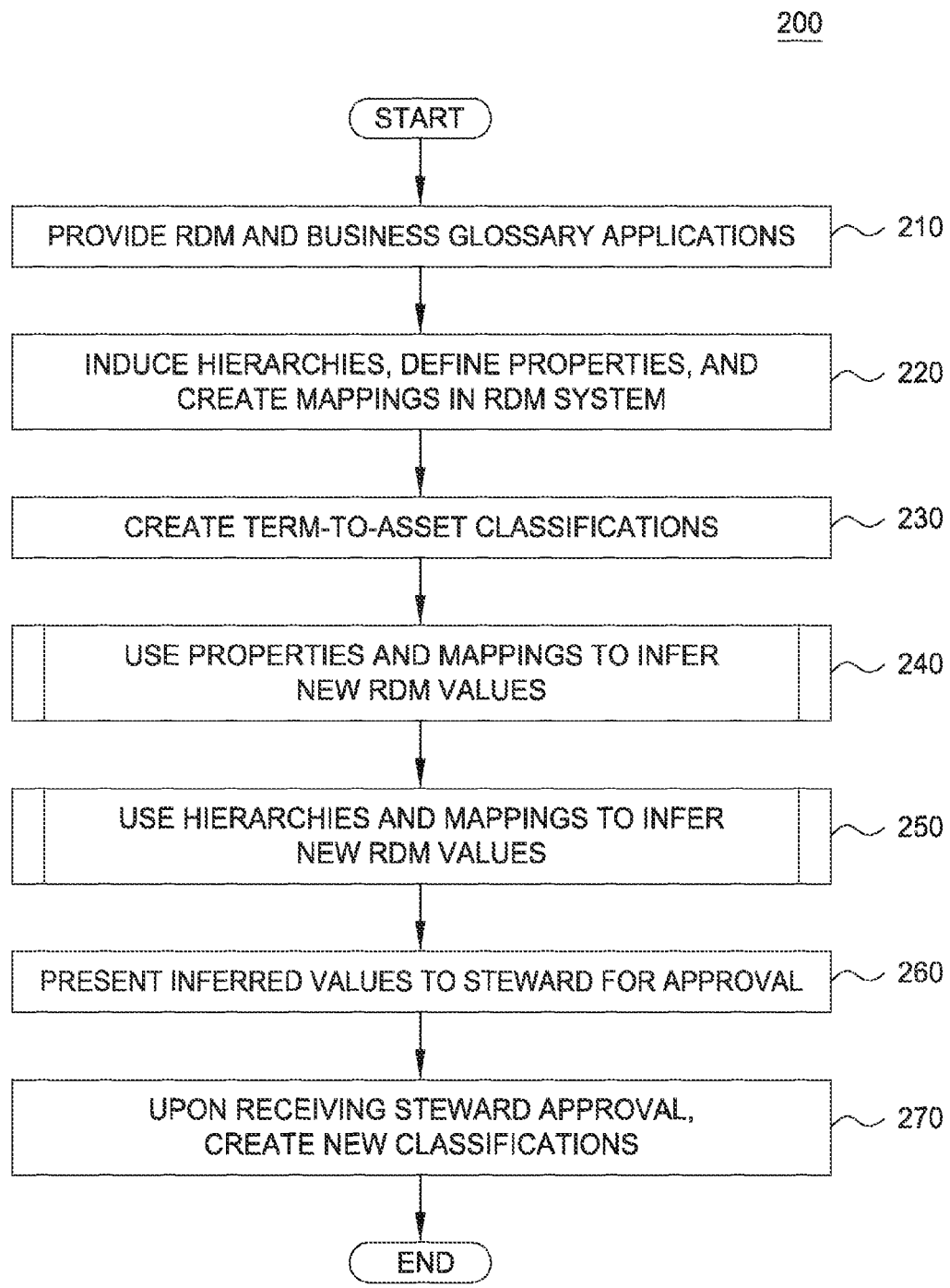
FIG. 2 is a flow chart illustrating a method to infer valid values for objects in a business glossary by using reference data, according to one embodiment disclosed herein.

FIG. 2 is a flow chart illustrating a method 200 to infer valid values for objects in a business glossary by using reference data, according to one embodiment disclosed herein. Generally, the steps of the method 200 infer valid values by implementing permutations of three key principles: (i) if the same or similar properties are defined for values from two different sets, then a correlation may be inferred between the two sets; (ii) if hierarchical values from two different reference data sets are mapped to each other, then if the values at the same depth are mapped, the implication is a tighter coupling between the two reference data sets, and thus, the other set has a higher chance to be a candidate for valid values; and (iii) if values from one set map to another set, then if one set is a candidate for valid values for a term, there is a strong chance that the other set would be a candidate for valid values as well.

At step 210, a reference data management (RDM) application and business glossary application are provided. At step 220, hierarchies on the reference data values may be induced, properties of the reference data values may be defined, and mappings between reference data values may be defined. The resulting hierarchies, properties, and mappings may be stored in the RDM data 148. At step 230, a plurality of term-to-asset classifications may be defined by a data steward. The classifications may map terms in the business glossary 145 to values in the RDM data 148. For example, a business term called "colors" in the business glossary 145 may be associated with a set named "colors" in the RDM data 148. Members of the set "colors" may include values such as "blue, green, red, orange" and the like. The resulting associations may be stored in the business glossary 145. Using these classifications, at step 240, described in greater detail with reference to FIG. 3, the inference tool 112 may use properties and mappings to infer new RDM values to associate with the business term. For example, if a set called "LightColors" has a property associating values of the set to the set "colors," the values from "LightColors" may be identified by the inference tool 112 as valid values for the term "colors" in the business glossary 145. At step 250, described in greater detail with reference to FIG. 4, the inference tool 112 may use hierarchies and mappings to infer new RDM values to associate with the business term. For example, if values from the "LightColors" are mapped to "colors," and the mapped values appear at the same level of a hierarchy in the RDM data 145 representing each set, the values from "LightColors" may be identified by the inference tool 112 as valid values for the term "colors" in the business glossary 145. At step 260, the inference tool 112 may present the inferred values to a data steward for approval. At step 270, upon receiving approval from the data steward, the inference tool 112 or the glossary manager 113 may cause a classification to be made in the business glossary 145 between the business term and the approved values.

Figure 3:
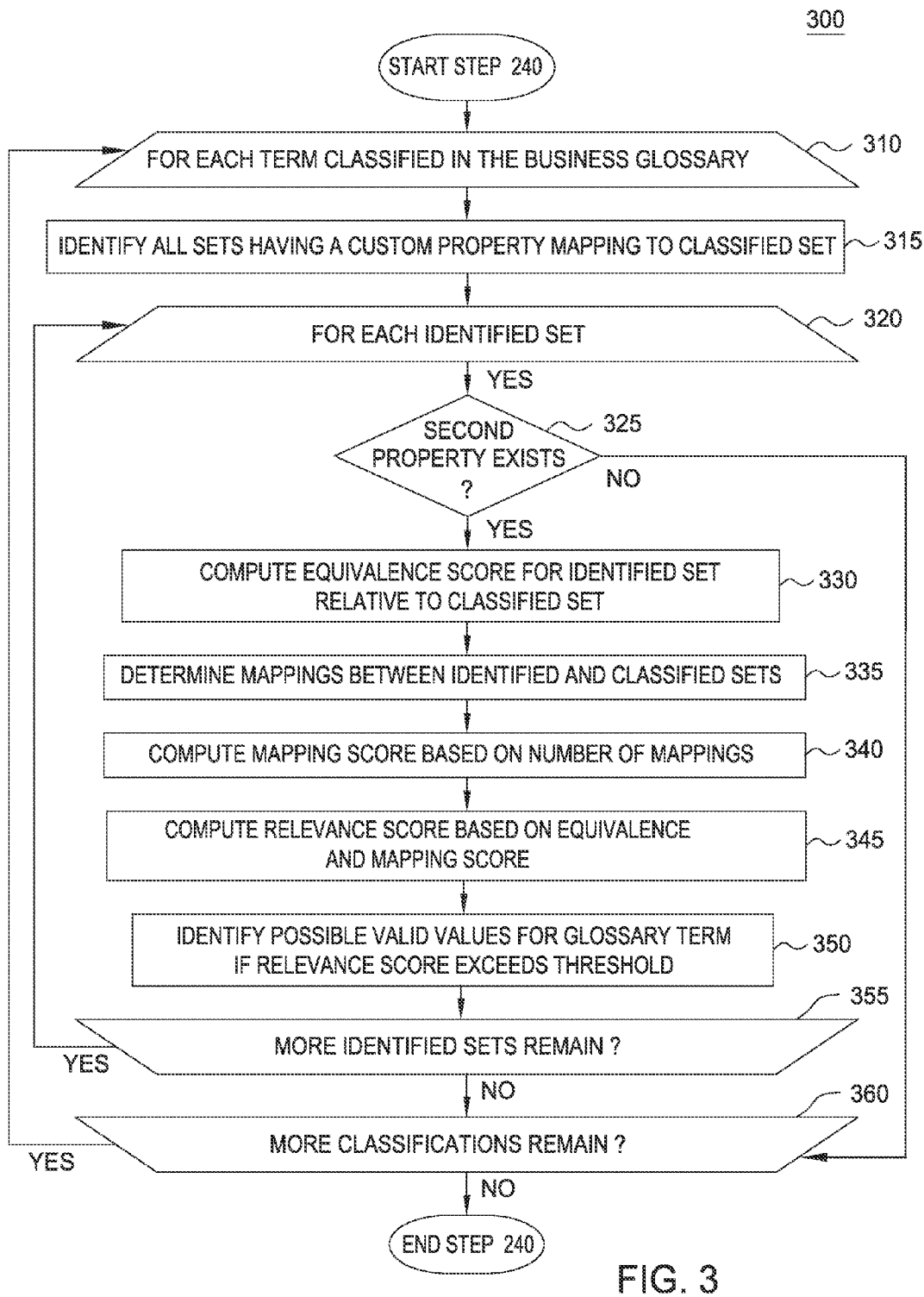
FIG. 3 is a flow chart illustrating a method to use properties and mappings to infer valid values for objects in a business glossary, according to one embodiment disclosed herein.

FIG. 3 is a flow chart illustrating a method 300 corresponding to step 240 to use properties and mappings to infer valid values for objects in a business glossary, according to one embodiment disclosed herein. In one embodiment, the inference tool 112 performs the steps of the method 300. The RDM application 114 may permit a user to define custom properties for reference data in the RDM data 148. For example, a custom property for a set "states" may include a property "hasCountry," which points to a set "countries." Therefore, a many-to-one mapping between states in the "states" set and countries in the "countries" set may be defined. Additionally, a many-to-many mapping may be defined for values in different sets in the RDM data 148. For example, mappings between values in a "colors" set and "LightColors" set may be defined as {Red→Light Red, Blue→Light Blue}. Based on these custom properties and mappings, the inference tool 112 may take as input an existing classification from the business glossary 145, and infer a new set of reference data values to enhance the coverage of the classifications.

At step 310, the inference tool 112 executes a loop including steps 315-360 for each classification between in the business glossary 145 between business terms and reference data sets. At step 315, the inference tool 112 identifies all sets having a first property mapping to the current classified set for each term in the current classification. Step 315 may include the inference tool 112 determining reference data sets R(a), where a=1, 2 . . . , n, in the RDM data 148, such that R(a) has a custom property p(a) such that the range of p(a) includes valid values in the current classification. For example, suppose there is a reference data set in the classification R(j)={Red, Blue, Green, Pink, Yellow}, and another reference data set called "candies" having a first custom property "hasColor" mapping into R(j), which indicates what color each of the candies in the "candies" set can be. The identified set would be "candies," and the first property would be "hasColor" in this example.

At step 320, the inference tool 112 begins executing a loop including steps 325-355 for each set identified at step 315. At step 325, the inference tool 112 determines whether the identified set has another property which is equivalent to the first identified property. The equivalence of the second property may be determined based on a syntactic equivalence such as a word-root comparison (e.g., "hasColor" vs. "hasLightColor"). The equivalence may be based on a semantic equivalence, such as "hasColor" vs. "hasShade." Finally, a distance measure may be used based on how far the two properties are situated in a lexical database, such as WordNet. In one embodiment, the inference tool 112 may assign confidence scores to each of the syntactic equivalence, the semantic equivalence, and the distance measure. In another embodiment, a combination of less than all of the syntactic equivalence, the semantic equivalence, and the distance measure may be used. If the equivalent second property exists, the method proceeds to step 330, otherwise, the method proceeds to step 355. At step 330, the inference tool 112 computes an equivalence score for the identified set based on the confidence scores of the semantic equivalence, syntactic equivalence, and distance measures computed at step 325. The equivalence score and the confidence scores may be based on any range suitable to indicate a range of scores. In one embodiment, if the equivalence score does not exceed a predefined equivalence threshold, the identified set is not considered as containing the equivalent second property, and its values are not identified as possible valid values. In such a case, the method may proceed to step 355.

At step 335, the inference tool 112 may retrieve the reference data sets represented by the first and second custom properties, and determines whether there are value mappings defined between the two reference data sets. For example, mappings between values in a "colors" set having values {Red, Blue, Green, Pink, Yellow} and "LightColors" set having values {Light Red, Light Blue, and Light Green} may be defined as {Red→Light Red, Blue→Light Blue}. At step 340, the inference tool 112 computes a mapping score for the identified set based on the number of shared mappings. For example, the weight may be computed by taking the number of mappings between the sets, and dividing the number of mappings by a maximum of the number of elements in each set. In the previous example, therefore, the mapping score may be computed as 2 (number of mappings)/max (3, 5) (number of values in each set)=2/5=0.4.

At step 345, the inference tool 112 may compute an overall relevance score based on the equivalence score and mapping score. For example, the overall relevance score may be computed by the following equation: relevance score=equivalence score*(1+delta*mapping score)+confidence variable, where delta is a fixed value less than 1, and the confidence is a variable initialized at zero, but increased for each suggested RDM value accepted by a data steward, and decreased for each suggested RDM value rejected by the data steward. For example, the confidence may be computed by taking the number of values in the accepted suggestion divided by the number of values in the initial classification. At step 350, the inference tool 112 identifies values from the identified set as possible valid values for the business glossary term if the relevance score exceeds a predefined threshold. The threshold may be set by a user or may be predefined by the inference tool 112. At step 355, the inference tool 112 determines whether more sets identified at step 315 remain. If more sets remain, the inference tool 112 returns to step 320. Otherwise, the inference tool 112 proceeds to step 360, where the inference tool 112 determines whether more term-to-asset classifications remain to be analyzed. If more classifications remain, the inference tool 112 returns to step 310. Otherwise, the method 300 ends.

Figure 4:
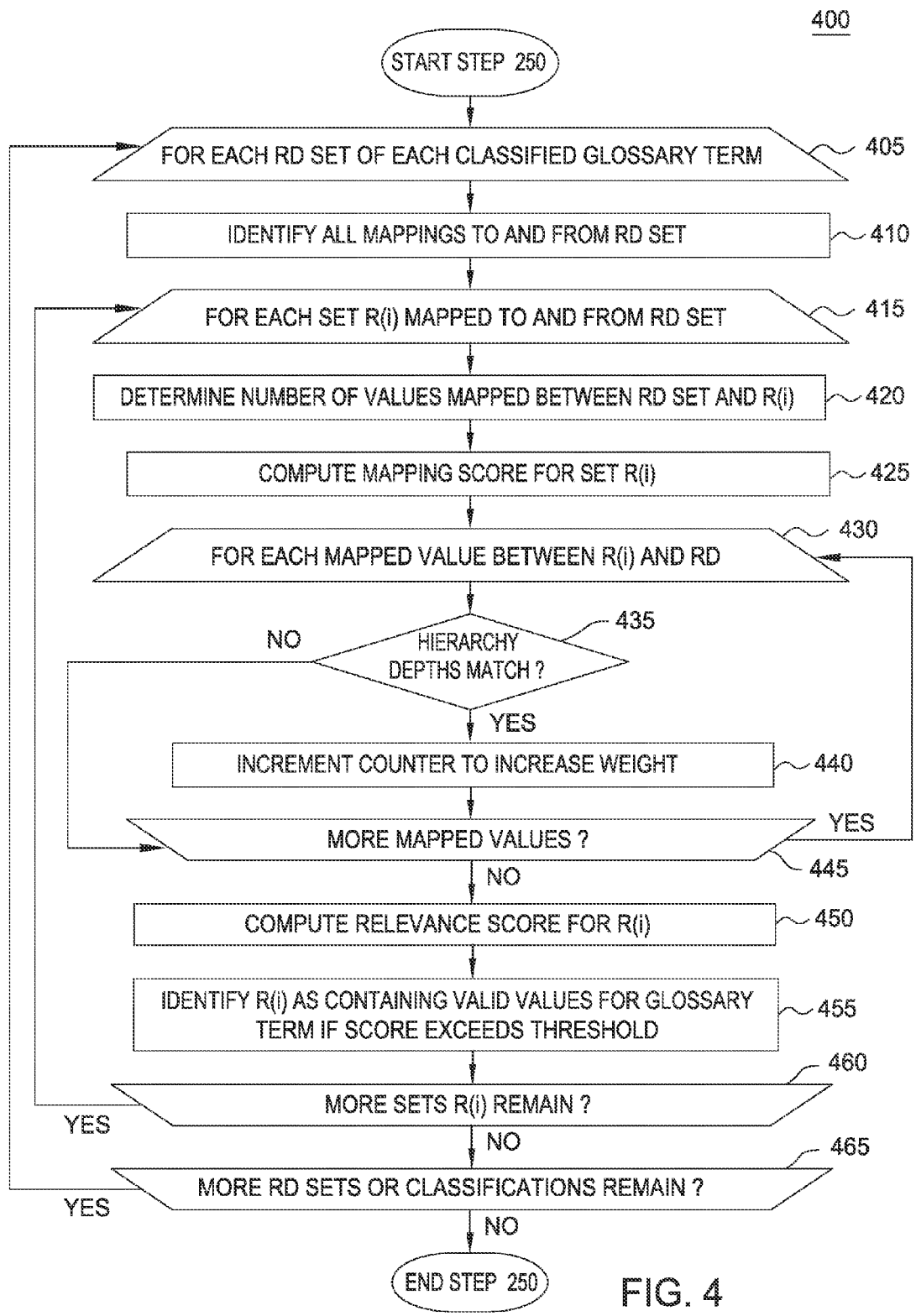
FIG. 4 is a flow chart illustrating a method to use hierarchies and mappings to infer valid values for objects in a business glossary, according to one embodiment disclosed herein.

FIG. 4 is a flow chart illustrating a method 400 corresponding to step 250 to use hierarchies and mappings to infer valid values for objects in a business glossary, according to one embodiment disclosed herein. In one embodiment, the inference tool 112 performs the steps of the method 300. One of the features provided by the RDM application 114 includes the ability to induce a hierarchy on the values in the RDM data 148, which may define associations between the values in the hierarchy. The hierarchy itself may be stored in the RDM data 148, or in a separate data structure managed by the RDM application 114. The RDM data 148 may also include mappings between values in different hierarchies for each data set. Additionally, the RDM data 148 may include mappings across value sets, such as a reference data set for "cities," which maps to a set called "languages spoken," to provide an association between cities and the languages spoken by people living in those cities. Generally, the method 400 utilizes the hierarchies and mappings to infer values that may be mapped to a term in a business glossary, based on existing classifications.

At step 405, the inference tool 112 begins executing a loop containing steps 410-460 for each reference data set RD of each classified glossary term in the business glossary 145. At step 410, the inference tool 112 identifies all mappings to and from the reference data set. Stated differently, the inference tool 112 at step 410 identifies all mappings that have the reference data set RD as a source or a target. For the purpose of illustration, the mapped sets may be referred to as the sets R(i), where i=1, 2, . . . n. At step 415, the inference tool 112 executes a loop containing steps 420-460 for each reference data set R(i) identified at step 410. At step 420, the inference tool 112 determines the number of values mapped between the reference data set RD and R(i). At step 425, the inference tool 112 calculates a mapping score based on the number of mappings detected at step 420. For example, the mapping score may be computed by taking the number of mappings detected at step 420, and dividing that value by the maximum value of the number of values in the two sets R(i) and RD.

At step 430, the inference tool 112 executes a loop containing steps 435-445 for each mapped value between R(i) and the reference data set RD to determine whether the mapped values are at the same depth in their respective hierarchies. For example, if the mapped value from R(i) is a first level node in the hierarchy for R(i), and the mapped value from the reference data set RD is a first level node in the hierarchy for the reference data set RD, there may be a greater likelihood that the value in R(i) may be a value for the term in the business glossary which is associated with the reference data set RD. At step 435, the inference tool 112 determines whether the hierarchy depths match. If the depths do not match, the inference tool 112 proceeds to step 445. If the hierarchy depths match, the inference tool 112 proceeds to step 440, where it increments a counter to increase a weight applied when scoring R(i) at step 450. By incrementing a counter, the inference tool 112 keeps track of the number of hierarchy depths that are a match between mapped values, and can lead to a greater probability that R(i) should be associated with the term in the business glossary 145. At step 445, the inference tool 112 determines whether more mapped values between R(i) and the reference data set RD exist. If more mapped values exist, the inference tool 112 returns to step 430. Otherwise, the inference tool 112 proceeds to step 450.

At step 450, the inference tool 112 computes a relevance score for R(i). This step may include normalizing a weight for the number of hierarchy mappings counted at step 440. For example, the counter may be normalized using any linear function, such that the counter value does not dominate the relevance score for R(i). An example formula for computing the relevance score at step 450 may be: relevance score=mapping score*(1+(normalized counter^2))+confidence value. As previously stated, the confidence score is a variable, initialized to equal zero, which is increased for each suggested RDM value accepted by a data steward, and decreased for each suggested RDM value rejected by the data steward. For example, the confidence may be computed by taking the number of values in the accepted suggestion divided by the number of values in the initial classification. At step 455, the inference tool 112 identifies R(i) as containing valid values for the glossary term if the relevance score exceeds a predefined threshold. The threshold may be set by a user, or may be predefined by the inference tool 112. At step 460, the inference tool 112 determines whether more sets R(i) remain to be examined. If more sets R(i) remain, the inference tool 112 returns to step 415. Otherwise, the inference tool 112 proceeds to step 465, where it determines whether more reference data sets and classifications remain. If more remain, the inference tool 112 returns to step 405. Otherwise, the method 400 ends.

Advantageously, embodiments disclosed herein may also include numerous permutations of custom properties, hierarchies, and mappings in order to identify possible reference data values which may be associated with terms in the business glossary. By presenting the inferred values to a data steward, who may approve, modify, or reject the inferred values, a more exhaustive and robust classification may be achieved. Additionally, the data steward may identify incorrect associations, which may be corrected to improve the accuracy of the associations in the business glossary. Advantageously, embodiments disclosed herein learn from previous classifications and the existing knowledge of how assets are interrelated to infer new values to associate with business glossary terms.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method, comprising:
   identifying a first classification, of a plurality of classifications relating a plurality of terms in a glossary to a set of values in a reference data management system, that relates a first term in the glossary to a first set of values in the reference data management system, wherein each of the plurality of classifications defines a set of valid values for each respective classified term;
   detecting a relationship between the first set of values and a second set of values in the reference data management system, by:
      identifying a first property of the second set of values defining an association between at least one member of the second set of values and a member of the first set of values;
      computing a weight for a second property of the second set of values; and
      determining that the weight for the second property exceeds a first predefined threshold;
   upon determining that a relevance score for a first value from the second set of values exceeds a second predefined threshold, identifying the first value to be classified with the first term in the glossary by operation of one or more computer processors; and
   creating a second classification relating the first term and the first value.

2. The method of claim 1, wherein the weight for the second property is based on at least one of: (i) detection of a syntactic equivalence of the first property and the second property, (ii) detection of a semantic equivalence of the first property and the second property, and (iii) a distance measure of the first property and the second property in a lexical database.

3. The method of claim 2, wherein the relevance score is based on: (i) the computed weight for the second property, and (ii) a count of mappings between values in the first set and values in the second set.

4. The method of claim 1, wherein detecting the relationship between the first and second sets of values comprises:
   determining a number of values in a mapping between the first set and the second set; and for each of the mapped values:
identifying a first hierarchy level of the mapped value of the first set in a first hierarchy induced on the values of the first set;
identifying a second hierarchy level of the mapped value of the second set in a second hierarchy induced on the values of the second set; and
determining whether the first hierarchy level equals the second hierarchy level.

5. The method of claim 4, wherein the relevance score is based on the number of values in the mapping between the first set and the second set and a count of the number of values in the mapping where the first hierarchy level equals the second hierarchy level.

6. The method of claim 1, further comprising:
presenting the first value to a data steward for validation; and
upon receiving approval of the first value from the data steward, creating the second classification in the glossary between the first term and the first value.

7. The method of claim 6, wherein the relevance score is further based on a confidence level indicating a number of previously presented values approved by the data steward.

8. A system, comprising:
one or more computer processors; and
a memory containing a program, which, when executed by the one or more computer processors, performs an operation comprising:
identifying a first classification, of a plurality of classifications relating a plurality of terms in a glossary to a set of values in a reference data management system, that relates a first term in the glossary to a first set of values in the reference data management system, wherein each of the plurality of classifications defines a set of valid values for each respective classified term;
detecting a relationship between the first set of values and a second set of values in the reference data management system, by:
identifying a first property of the second set of values defining an association between at least one member of the second set of values and a member of the first set of values;
computing a weight for a second property of the second set of values; and
determining that the weight for the second property exceeds a first predefined threshold;
upon determining that a relevance score for a first value from the second set of values exceeds a second predefined threshold, identifying the first value to be classified with the first term in the glossary; and
creating a second classification relating the first term and the first value.

9. The system of claim 8, wherein the weight for the second property is based on at least one of: (i) detection of a syntactic equivalence of the first property and the second property, (ii) detection of a semantic equivalence of the first property and the second property, and (iii) a distance measure of the first property and the second property in a lexical database.

10. The system of claim 9, wherein the relevance score is based on: (i) the computed weight for the second property, and (ii) a count of mappings between values in the first set and values in the second set.

11. The system of claim 8, wherein detecting the relationship between the first and second sets of values comprises:
determining a number of values in a mapping between the first set and the second set; and
for each of the mapped values:
identifying a first hierarchy level of the mapped value of the first set in a first hierarchy induced on the values of the first set;
identifying a second hierarchy level of the mapped value of the second set in a second hierarchy induced on the values of the second set; and
determining whether the first hierarchy level equals the second hierarchy level.

12. The system of claim 11, wherein the relevance score is based on the number of values in the mapping between the first set and the second set and a count of the number of values in the mapping where the first hierarchy level equals the second hierarchy level.

13. The system of claim 8, the operation further comprising:
presenting the first value to a data steward for validation; and
upon receiving approval of the first value from the data steward, creating the second classification in the glossary between the first term and the first value.

14. The system of claim 13, wherein the relevance score is further based on a confidence level indicating a number of previously presented values approved by the data steward.

15. A non-transitory computer readable medium, comprising:
computer-readable program code, that, when executed by a processor, performs an operation comprising:
identifying a first classification, of a plurality of classifications relating a plurality of terms in a glossary to a set of values in a reference data management system, that relates a first term in the glossary to a first set of values in the reference data management system, wherein each of the plurality of classifications defines a set of valid values for each respective classified term
detecting a relationship between the first set of values and a second set of values in the reference data management system, by:
identifying a first property of the second set of values defining an association between at least one member of the second set of values and a member of the first set of values;
computing a weight for a second property of the second set of values; and
determining that the weight for the second property exceeds a first predefined threshold;
upon determining that a relevance score for a first value from the second set of values exceeds a second predefined threshold, identifying the first value to be classified with the first term in the glossary; and
creating a second classification relating the first term and the first value.

16. The computer readable medium of claim 15, wherein the weight for the second property is based on at least one of: (i) detection of a syntactic equivalence of the first property and the second property, (ii) detection of a semantic equivalence of the first property and the second property, and (iii) a distance measure of the first property and the second property in a lexical database.

17. The computer readable medium of claim 16, wherein the relevance score is based on: (i) the computed weight for the second property, and (ii) a count of mappings between values in the first set and values in the second set.

18. The computer readable medium of claim 15, wherein detecting the relationship between the first and second sets of values comprises:

determining a number of values in a mapping between the first set and the second set; and for each of the mapped values:
identifying a first hierarchy level of the mapped value of the first set in a first hierarchy induced on the values of the first set;

identifying a second hierarchy level of the mapped value of the second set in a second hierarchy induced on the values of the second set; and determining whether the first hierarchy level equals the second hierarchy level.

19. The computer readable medium of claim 18, wherein the relevance score is based on the number of values in the mapping between the first set and the second set and a count of the number of values in the mapping where the first hierarchy level equals the second hierarchy level.

20. The computer readable medium of claim 15, further comprising:

presenting the first value to a data steward for validation; and upon receiving approval of the first value from the data steward, creating the second classification in the glossary between the first term and the first value.

21. The computer readable medium of claim 20, wherein the relevance score is further based on a confidence level indicating a number of previously presented values approved by the data steward.

* * * * *